United States Patent
Sakai et al.

(10) Patent No.: US 6,168,692 B1
(45) Date of Patent: Jan. 2, 2001

(54) APPARATUS FOR GENERATING ALKALI ION WATER

(75) Inventors: Toshisuke Sakai, Fukuoka; Narumi Nagase, Fukuoka-ken, both of (JP)

(73) Assignee: Matsushita Electric Industrial Co., Ltd., Osaka (JP)

(*) Notice: Under 35 U.S.C. 154(b), the term of this patent shall be extended for 0 days.

(21) Appl. No.: 08/251,999

(22) Filed: Jun. 1, 1994

(30) Foreign Application Priority Data

Jun. 3, 1993 (JP) .................................................. 5-133105

(51) Int. Cl.[7] .............................. C25B 15/00; C25B 9/00
(52) U.S. Cl. .................................. 204/228.1; 204/228.6; 204/229.8; 204/230.2; 204/230.8; 204/240; 204/252; 204/257; 204/264
(58) Field of Search ................................... 204/306, 305, 204/252, 228.1, 228.6, 229.8, 230.2, 230.8, 240, 257, 264

(56) References Cited

U.S. PATENT DOCUMENTS

| | | | |
|---|---|---|---|
| 5,051,161 | * 9/1991 | Yamaguchi | 204/229 |
| 5,055,170 | * 10/1991 | Saito | 204/228 |
| 5,306,409 | * 4/1994 | Arai | 204/228 |

FOREIGN PATENT DOCUMENTS 53-88666    8/1978 (JP).

* cited by examiner

Primary Examiner—Donald R. Valentine
(74) Attorney, Agent, or Firm—McDermott, Will & Emery

(57) ABSTRACT

An apparatus for generating alkali ion water includes an electrolytic cell. At least two electrodes are disposed in the electrolytic cell. A diaphragm disposed in the electrolytic cell extends between the electrodes. A dc voltage is supplied to the electrodes. A mean value of the dc voltage is varied at a given inclination. A first detecting device operates to detect an ac current and generate a signal representative thereof. The dc voltage is derived from the ac current. A second detecting device operates to detect the mean value of the dc voltage in response to the signal generated by the first detecting device. A third detecting device operates to detect an inclination in a variation in the mean value of the dc voltage in response to the mean value of the dc voltage which is detected by the second detecting device. The mean value of the dc voltage is controlled in response to the inclination detected by the third detecting device.

15 Claims, 5 Drawing Sheets

APPARATUS FOR GENERATING ALKALI ION WATER

BACKGROUND OF THE INVENTION

1. Field of the Invention

This invention generally relates to an apparatus for generating water containing alkali ions. This invention specifically relates to an apparatus for electrolyzing source water such as city water or well water into alkali ion water (water containing alkali ions) and acid ion water (water containing acid ions).

2. Description of the Prior Art

Water containing alkali ions is used as drink or medical water. Water containing acid ions is used for makeup or sterilizing and cleaning purposes. It is known to electrolyze source water such as city water or well water into alkali ion water and acid ion water.

A typical prior-art water adjuster using electrolysis includes a filtering section provided with activated charcoal or a hollow fiber membrane. The filtering section removes impurities, bacteria, and remaining chlorine from source water. The filtering section is followed by a mineral supply section which adds mineral such as calcium glycerophosphate to the source water to increase the electric conductivity of the source water. The mineral supply section is followed by an electrolytic cell having a pair of chambers separated by a diaphragm from each other. Electrodes are disposed in the chambers respectively. The source water flows into the chambers from the mineral supplying section. A dc voltage is applied between the electrodes so that the source water in the chambers is electrolyzed into alkali ion water and acid ion water.

In the prior-art water adjuster, the pH of the generated alkali ion water and the pH of the generated acid ion water can be adjusted by changing the magnitude of the dc voltage applied between the electrodes. In the case where the prior-art water adjuster restarts after a long-period suspension of operation, the electrolytic cell tends to be supplied with water containing a large amount of mineral or highly-conductive water so that the electrolytic cell is liable to receive an excessively-great electric current. Such an excessively-great electric current causes an instability in the pH of generated alkali ion water and the pH of generated acid ion water.

Japanese published unexamined patent application 53-88666 discloses a potable water generator having an electrolytic cell for changing neutral water into alkali ion water and acid ion water. The prior-art potable water generator includes a circuit for limiting an electric current flowing in the electrolytic cell.

SUMMARY OF THE INVENTION

It is an object of this invention to provide an improved apparatus for generating alkali ion water.

A first aspect of this invention provides an apparatus for generating alkali ion water which comprises an electrolytic cell; at least two electrodes disposed in the electrolytic cell; a diaphragm disposed in the electrolytic cell and extending between the electrodes; means for supplying a dc voltage to the electrodes; and means for varying a mean value of the dc voltage at a given inclination.

A second aspect of this invention provides an apparatus for generating alkali ion water which comprises means for filtering source water; means, connected to the filtering means, for supplying mineral to the source water; an electrolytic cell connected to the mineral supplying means; at least two electrodes disposed in the electrolytic cell; a diaphragm disposed in the electrolytic cell and extending between the electrodes; means for supplying a dc voltage to the electrodes; and means for varying a mean value of the dc voltage at a given inclination.

A third aspect of this invention provides an apparatus for generating alkali ion water which comprises means for filtering source water; means, connected to the filtering means, for supplying mineral to the source water; an electrolytic cell connected to the mineral supplying means; at least two electrodes disposed in the electrolytic cell; a diaphragm disposed in the electrolytic cell and extending between the electrodes; first detecting means for detecting an ac current and generating a signal representative thereof; means for deriving a dc voltage from the ac current and supplying the dc voltage to the electrodes; second detecting means for detecting a mean value of the dc voltage in response to the signal generated by the first detecting means; means for determining a desired mean value of the dc voltage in response to a desired pH of generated ion water; means for comparing the mean value of the dc voltage which is detected by the second detecting means with a given range around the desired mean value; an indicator; and means for controlling the indicator in response to a result of comparison by the comparing means.

A fourth aspect of this invention provides an apparatus for generating alkali ion water which comprises means for filtering source water; means, connected to the filtering means, for supplying mineral to the source water; an electrolytic cell connected to the mineral supplying means and having an outlet; at least two electrodes disposed in the electrolytic cell; a diaphragm disposed in the electrolytic cell and extending between the electrodes; a discharge passage; a drain passage; means for selectively connecting the outlet of the electrolytic cell to the discharge passage or the drain passage; means for supplying a dc voltage to the electrodes; and means for varying a mean value of the dc voltage at a given inclination.

A fifth aspect of this invention provides an apparatus for generating alkali ion water which comprises means for filtering source water; means, connected to the filtering means, for supplying mineral to the source water; an electrolytic cell connected to the mineral supplying means and having an outlet; at least two electrodes disposed in the electrolytic cell; a diaphragm disposed in the electrolytic cell and extending between the electrodes; a discharge passage; a drain passage; means for selectively connecting the outlet of the electrolytic cell to the discharge passage or the drain passage; first detecting means for detecting an ac current and generating a signal representative thereof; means for deriving a dc voltage from the ac current and supplying the dc voltage to the electrodes; second detecting means for detecting a mean value of the dc voltage in response to the signal generated by the first detecting means; means for determining a desired mean value of the dc voltage in response to a desired pH of generated ion water; means for comparing the mean value of the dc voltage which is detected by the second detecting means with a given range around the desired mean value; an indicator; and means for controlling the indicator in response to a result of comparison by the comparing means.

A sixth aspect of this invention provides an apparatus for generating alkali ion water which comprises means for filtering source water; means, connected to the filtering means, for supplying mineral to the source water; an electrolytic cell connected to the mineral supplying means and having an outlet; at least two electrodes disposed in the electrolytic cell; a diaphragm disposed in the electrolytic cell and extending between the electrodes; a discharge passage; a drain passage; means for selectively connecting the outlet of the electrolytic cell to the discharge passage or the drain passage; first detecting means for detecting an ac current and generating a signal representative thereof; means for deriving a dc voltage from the ac current and supplying the dc voltage to the electrodes; second detecting means for detecting a mean value of the dc voltage in response to the signal generated by the first detecting means; third detecting means for detecting an inclination in a variation in the mean value of the dc voltage in response to the mean value of the dc voltage which is detected by the second detecting means; means for increasing the mean value of the dc voltage at an inclination; and means for controlling the inclination in a range of 18 V/second to 9 V/second in response to the inclination detected by the third detecting means; means for determining a desired mean value of the dc voltage in response to a desired pH of generated ion water: means for comparing the mean value of the dc voltage which is detected by the second detecting means with a given range around the desired mean value; an indicator; and means for controlling the indicator in response to a result of comparison by the comparing means.

A seventh aspect of this invention provides an apparatus for generating alkali ion water which comprises an electrolytic cell for electrolyzing source water into alkali ion water and acid ion water; means for supplying a dc voltage to the electrolytic cell; and means for varying a mean value of the dc voltage at a given inclination.

An eighth aspect of this invention provides an apparatus for generating alkali ion water which comprises an electrolytic cell for electrolyzing source water into alkali ion water and acid ion water; means for supplying a dc voltage to the electrolytic cell; and means for detecting a rate of a variation in a mean value of the dc voltage.

A ninth aspect of this invention provides an apparatus for generating alkali ion water which comprises an electrolytic cell; at least two electrodes disposed in the electrolytic cell; a diaphragm disposed in the electrolytic cell and extending between the electrodes; means for supplying a dc voltage to the electrodes; and means for detecting a rate of a variation in a mean value of the dc voltage.

A tenth aspect of this invention provides an apparatus for generating ion water which comprises an electrolytic cell for electrolyzing source water into ion water; means for supplying a dc voltage to the electrolytic cell; means for gradually increasing an effective level of the dc voltage at a rate; and means for limiting the rate to within a predetermined range.

DESCRIPTION OF THE PREFERRED EMBODIMENTS

Figure 1:
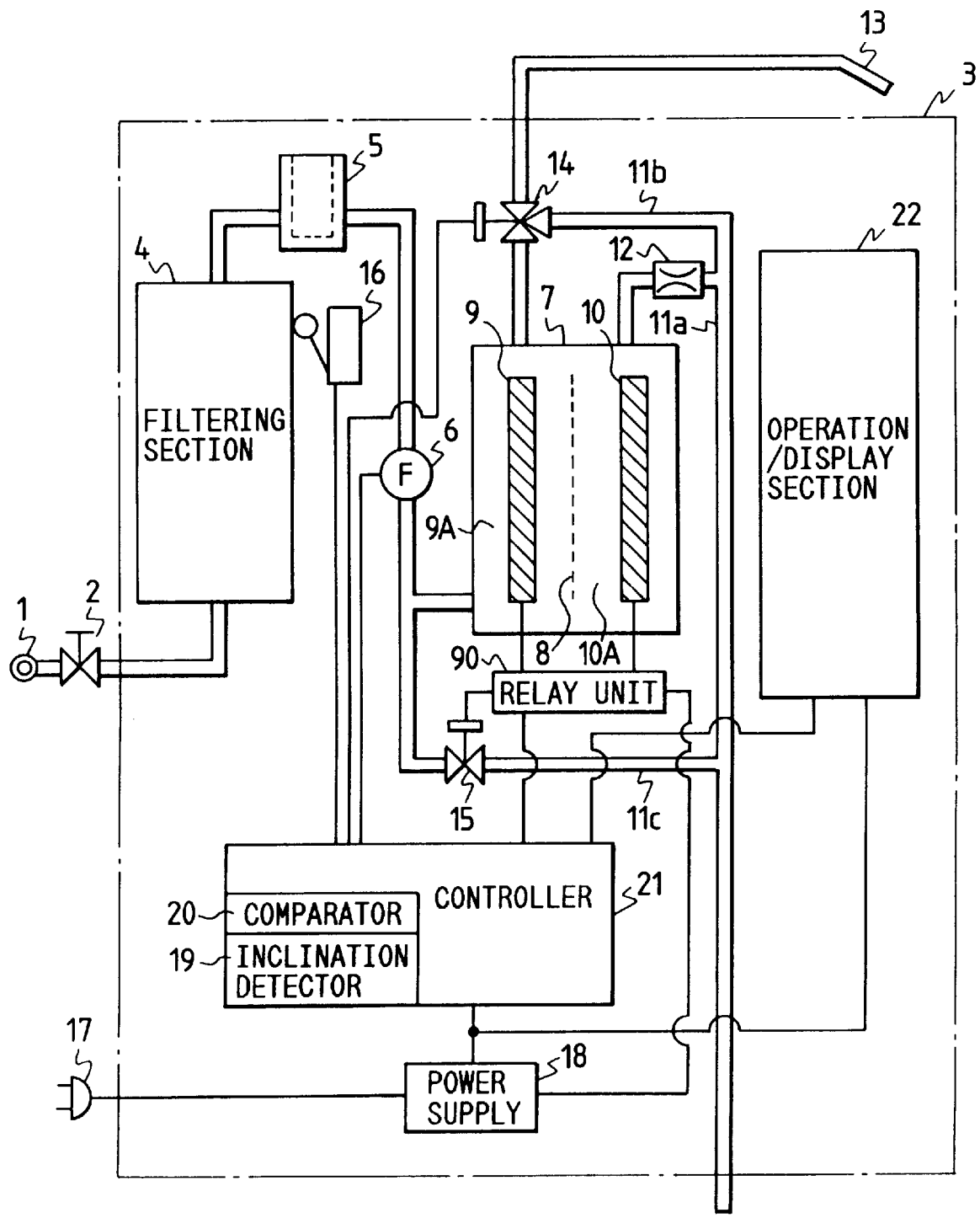
FIG. 1 is a diagram of an apparatus for generating alkali ion water according to an embodiment of this invention.

With reference to FIG. 1, an apparatus 3 for generating alkali ion water includes a filtering section 4 to which a source water pipe 1 such as a city water pipe or a well water pipe is connected via a cock 2. When the cock 2 is in an open position, source water is permitted to enter the filtering section 4 from the source water pipe 1. When the cock 2 is in a closed position, the supply of the source water to the filtering section 4 is inhibited.

The filtering section 4 contains activated charcoal and a filter such as a hollow fiber membrane. The activated charcoal removes remaining chlorine from the source water. The filter removes impurities and bacteria from the source water.

A mineral supply section 5 following the filtering section 4 receives the source water from the filtering section 4. The mineral supply section 5 adds minerals such as calcium glycerophosphate and calcium lactate to the source water to increase the electric conductivity of the source water.

The mineral supply section 5 is connected to an electrolytic cell 7 via a water passage in which a flow rate sensor 6 is disposed. The source water flows into the electrolytic cell 7 from the mineral supply section 5 via the flow rate sensor 6. The flow rate sensor 6 detects the rate of the flow of the source water in the water passage, that is, the rate of the flow of the source water into the electrolytic cell 7.

The interior of the electrolytic cell 7 is divided by a diaphragm 8 into a pair of chambers 9A and 10A in which electrodes 9 and 10 are disposed respectively. The chambers 9A and 10A in the electrolytic cell 7 communicate with each other via a lower opening which extends through the diaphragm 8.

A drain pipe 11a is connected via a flow rate adjusting section 12 to the chamber 10A in the electrolytic cell 7. Water flows to the drain pipe 11a from the chamber 10A in the electrolytic cell 7. The rate of the flow of the water to the drain pipe 11a is controlled by the flow rate adjusting section 12. The flow rate adjusting section 12 includes, for example, a restriction or a valve.

A discharge pipe 13 is connected to a first outlet of a three-way electromagnetic valve (a three-way solenoid valve) 14. A second outlet of the three-way valve 14 is connected via a pipe 11b to a region of the drain pipe 11a downstream of the flow rate adjusting section 12. An inlet of the three-way valve 14 is connected via a pipe to the chamber 9A in the electrolytic cell 7.

The three-way valve 14 can be changed between a first position and a second position. When the three-way valve 14 assumes the first position, its inlet is connected to the first outlet and is disconnected from the second outlet so that water flows to the discharge pipe 13 from the chamber 9A in the electrolytic cell 7. When the three-way valve 14 assumes the second position, its inlet is connected to the second outlet and is disconnected from the first outlet so that water flows to the drain pipe 11a from the chamber 9A in the electrolytic cell 7.

One end of a pipe 11c is connected to the water passage between the flow rate sensor 6 and the electrolytic cell 7. The other end of the pipe 11c is connected to a region of the drain pipe 11a downstream of the flow rate adjusting section 12 and the connection with the pipe 11b. An electromagnetic valve 15 is disposed in the pipe 11c.

A cartridge sensor 16 detects whether a cartridge for the filtering section 4 is present or absent.

A power supply 18 can be electrically connected to an ac power line (not shown) via a plug 17. The power supply 18 can receive an ac voltage from the ac power line via the plug 17. The power supply 18 is electrically connected to a controller 21, an operation/display section 22, and a relay unit 90.

The controller 21 is electrically connected to the flow rate sensor 6, the three-way valve 14, the cartridge sensor 16, the operation/display section 22, and the relay unit 90. The relay unit 90 is electrically connected to the electrodes 9 and 10. Also, the relay unit 90 is electrically connected to the electromagnetic valve 15.

The controller 21 receives output signals of the flow rate sensor 6, the cartridge sensor 16, and the operation/display section 22. The controller 21 outputs signals to the three-way valve 14, the operation/display section 22, and the relay unit 90 to control them.

The controller 21 also controls the electromagnetic valve 15 via the relay unit 90. The controller 21 includes a microcomputer or a similar device which has a combination of an I/O port, a CPU, a RAM, and a ROM. The controller 21 operates in accordance with a program stored in the ROM.

The operation of the apparatus 3 can be changed among a plurality of different modes including an alkali ion water generating mode, an acid ion water generating mode, a filtered water generating mode, and an electrode cleaning mode. The user or operator can select one of the modes of operation of the apparatus 3 by actuating the operation/display section 22. In addition, the user or operator can set a desired pH of generated ion water by actuating the operation/display section 22. The operation/display section 22 indicates operating conditions of the apparatus 3 which include a selected mode of operation thereof and a desired pH of generated ion water.

As will be made clear later, the controller 21 can serve as an inclination detector (a slope detector) 19 which detects a rate or an inclination (a slope) of a change in a mean value of a dc voltage applied between the electrodes 9 and 10. The controller 21 can also serve as a comparator 20 which compares a mean value of a dc voltage applied between the electrodes 9 and 10 with a reference mean voltage value determined by the desired pH of generated ion water. The comparator 20 may also compare the value of a mean electric current through the electrodes 9 and 10 with a reference mean current value determined by the desired pH of generated ion water.

Figure 2:
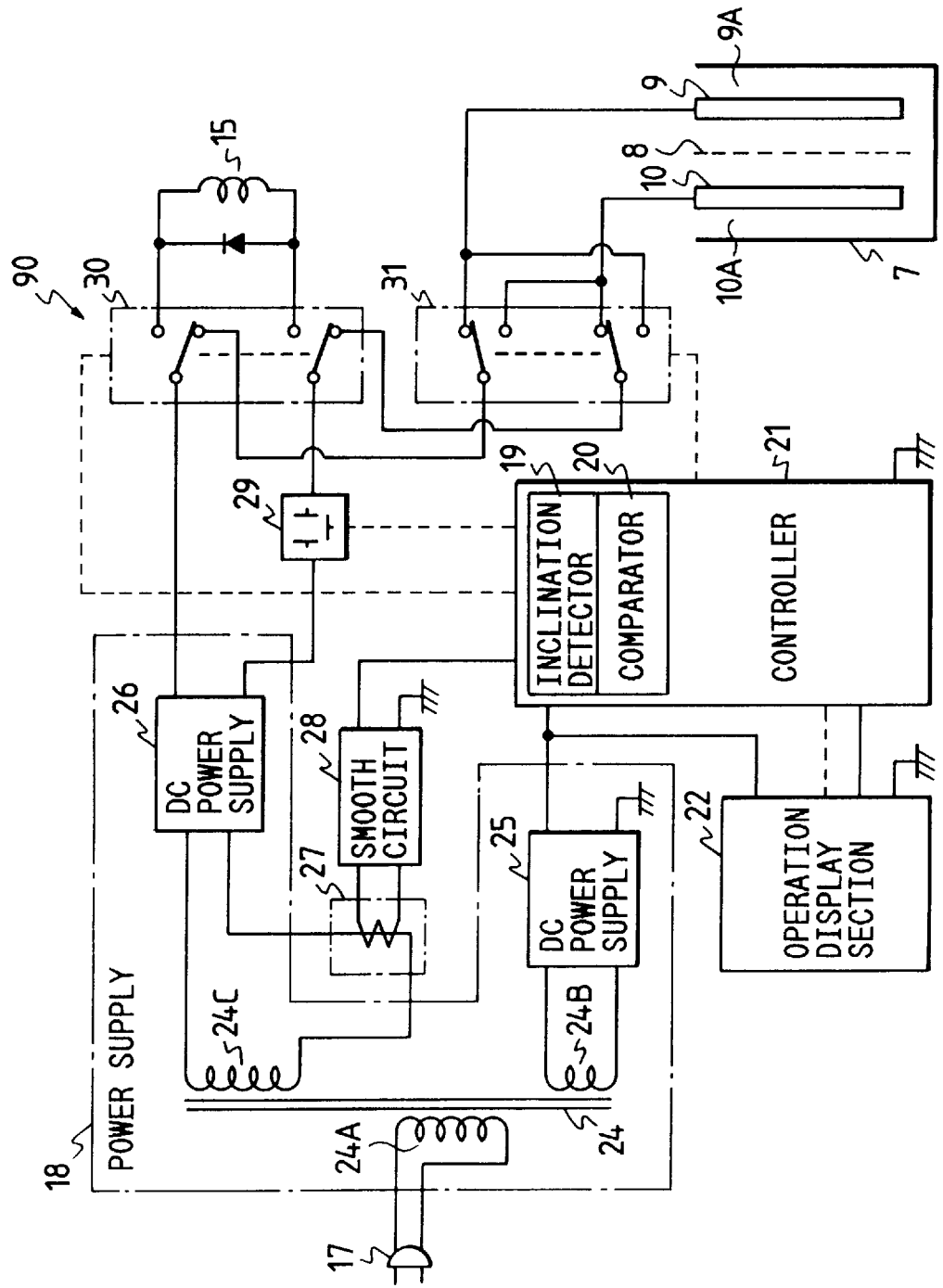
FIG. 2 is a diagram of an electric portion of the apparatus in FIG. 1.

As shown in FIG. 2, the power supply 18 includes a transformer 24 having a primary winding 24A and secondary windings 24B and 24C. The primary winding 24A is connected to the plug 17. The secondary winding 24B is connected to a dc power supply 25 including a rectifying circuit. The dc power supply 25 is connected to the controller 21 and the operation/display section 22. An ac voltage which appears across the secondary winding 24B is converted by the dc power supply 25 into a dc voltage. The dc power supply 25 feeds the dc voltage to the controller 21 and the operation/display section 22 to power them.

The secondary winding 24C of the transformer 24 is connected via a current transducer or a current sensor 27 to a dc power supply 26 including a rectifying circuit. The dc power supply 26 is connected to the electrodes 9 and 10 via the relay unit 90. An ac voltage which appears across the secondary winding 24C is converted by the dc power supply 26 into a dc voltage. The dc voltage generated by the dc power supply 26 can be applied between the electrodes 9 and 10 via the relay unit 90 as an electrolyzing voltage. The dc power supply 26 is also connected to the control winding of the electromagnetic valve 15 via the relay unit 90. The dc voltage generated by the dc power supply 26 can be applied to the electromagnetic valve 15 via the relay unit 90.

The current transducer 27 detects an ac current which flows into the dc power supply 26 from the secondary winding 24C of the transformer 24. The current transducer 27 is followed by a rectifying/smoothing circuit 28. An output signal of the current transducer 27 is converted by the rectifying/smoothing circuit 28 into a signal having a voltage which varies as a function of the magnitude or amplitude of the ac current detected by the current transducer 27. The rectifying/smoothing circuit 28 outputs the voltage signal to the controller 21.

The relay unit 90 includes a voltage adjuster 29, and relays 30 and 31. A first output terminal of the dc power supply 26 is directly connected to the relay 30. A second output terminal of the dc power supply 26 is connected to the relay 30 via the voltage adjuster 29. The relay 30 is connected to the relay 31. The relay 30 is also connected to the control winding of the electromagnetic valve 15. The relay 31 is connected to the electrodes 9 and 10. Control terminals of the voltage-adjuster 29 and the relays 30 and 31 are connected to the controller 21.

The dc voltage outputted from the dc power supply 26 can be applied between the electrodes 9 and 10 via the voltage adjuster 29 and the relays 30 and 31. The dc voltage outputted from the dc power supply 26 can be applied to the electromagnetic valve 15 via the voltage adjuster 29 and the relay 30. The relay 30 functions to selectively transmit the dc voltage to the electrodes 9 and 10 or to the electromagnetic valve 15. The relay 30 is controlled by an output signal from the controller 21. The relay 31 functions to change the polarity of the dc voltage applied between the electrodes 9 and 10. Specifically, the relay 31 can change between a first state and a second state. When the relay 31 assumes the first state, the electrode 9 receives a negative potential and the electrode 10 receives a positive potential. When the relay 31 assumes the second state, the electrode 9 receives a positive potential and the electrode 10 receives a negative potential. The relay 31 is controlled by an output signal from the controller 21.

The electrolyzing voltage generated by the power supply 26 is preferably held constant. The voltage adjuster 29 includes a switch which can change between an on state (a closed state) and an off state (an open state). The voltage adjuster 29 functions to vary a mean level (a mean magnitude or an effective level) of the dc voltage applied between the electrodes 9 and 10. The voltage adjuster 29 is controlled by an output signal from the controller 21. Specifically, the output signal from the controller 21 to the voltage adjuster 29 is a pulse signal having a predetermined constant frequency and a variable duty cycle (duty factor). To this end, the I/O port in the controller 21 includes a combination of a pulse signal generator and a pulse-width modulator. The frequency of the pulse signal fed to the voltage adjuster 29 is preferably equal to a value in the range of 100 Hz to 1,000 Hz. The switch in the voltage adjuster 29 changes between the on state and the off state in response to the pulse signal fed from the controller 21. As the duty cycle of the pulse signal fed to the voltage adjuster 29 increases, the mean level (the mean magnitude or the effective level) of the dc voltage applied between the electrodes 9 and 10 rises.

The apparatus 3 operates as follows. When the cock 2 is changed to the open position, source water enters the filtering section 4 from the source water pipe 1. The filtering section 4 removes remaining chlorine, impurities, and bacteria from the source water. The source water flows from the filtering section 4 to the mineral supply section 5. The mineral supply section 5 adds minerals such as calcium glycerophosphate and calcium lactate to the source water to increase the electric conductivity of the source water. The source water flows from the mineral supply section 5 to the electrolytic cell 7 via the flow rate sensor 6. The flow rate sensor 6 detects the rate of the flow of the source water in the water passage, that is, the rate of the flow of the source water into the electrolytic cell 7. The chambers 9A and 10A in the electrolytic cell 7 are filled with the source water.

The power supply 18 feeds the dc voltage to the controller 21 and the operation/display section 22 to power them. The power supply 18 generates the dc voltage for electrolysis which is fed to the relay unit 90.

The controller 21 receives an output signal from the flow rate sensor 6 which represents the rate of the flow of the source water into the electrolytic cell 7. Thus, the controller 21 is informed of the detected rate of the flow of the source water into the electrolytic cell 7. The controller 21 decides whether or not the detected rate of the flow of the source water into the electrolytic cell 7 exceeds a predetermined reference flow rate. When the detected flow rate exceeds the reference flow rate, the controller 21 detects that the water supply to the electrolytic cell 7 is currently present. In this case, the controller 21 executes subsequent processes which will be indicated later. On the other hand, when the detected flow rate does not exceed the reference flow rate, the controller 21 detects that the water supply to the electrolytic cell 7 is currently absent. In this case, the controller 21 falls into a stand-by state for waiting the occurrence of the water supply to the electrolytic cell 7.

When the controller 21 detects the presence of the water supply to the electrolytic cell 7, the controller 21 detects the selected mode of operation of the apparatus 3 by referring to an output signal from the operation/display section 22.

In the case where the selected mode of operation agrees with the alkali ion water generating mode, the controller 21 sets the relays 30 and 31 in the relay unit 90 so that a positive potential is applied to the electrode 10 and⁻ a negative potential is applied to the electrode 9. The application of the dc voltage between the electrodes 9 and 10 causes electrolysis in the electrolytic cell 7. Specifically, the source water in the electrolytic cell 7 is electrolyzed into alkali ion water and acid ion water. In the electrolytic cell 7, the alkali ion water occurs in the chamber 9A while the acid ion water occurs in the chamber 10A. The controller 21 derives information of a desired pH of the generated ion water from an output signal of the operation/display section 22. In addition, the controller 21 derives information of the rate of the source water supply to the electrolytic cell 7 from an output signal of the flow rate sensor 6. The controller 21 calculates or determines a desired mean dc voltage applied between the electrodes 9 and 10 in response to the desired pH of the generated ion water and the rate of the source water supply to the electrolytic cell 7. During an initial stage, the controller 21 gradually increases the actual mean dc voltage applied between the electrodes 9 and 10 to the desired mean dc voltage. The increase in the actual mean dc voltage is realized by increasing the duty cycle of the output pulse signal to the voltage adjuster 29. Until the actual mean dc voltage reaches the desired mean dc voltage, the controller 21 judges an actual pH of the generated ion water to be different from the desired pH thereof. Accordingly, the controller 21 changes the three-way valve 14 so that the chamber 9A in the electrolytic cell 7 communicates with the drain pipe 11a and hence the water flows from the chamber 9A to the drain pipe 11a. The water is removed from the apparatus 3 via the drain pipe 11a. On the other hand, when the actual mean dc voltage reaches the desired mean dc voltage, the controller 21 judges the actual pH of the generated ion water to be equal to the desired pH thereof. Accordingly, the controller 21 changes the three-way valve 14 so that the chamber 9A in the electrolytic cell 7 communicates with the discharge pipe 13 and hence the alkali ion water flows from the chamber 9A to the discharge pipe 13. The alkali ion water is continuously discharged from the apparatus 3 via the discharge pipe 13. When the detected rate of the flow of the source water into the electrolytic cell 7 drops to or below the reference flow rate, the controller 21 changes and sets the voltage adjuster 29 so that the application of the dc voltage between the electrodes 9 and 10 is continuously inhibited. Thus, the alkali ion water generating mode of operation terminates.

In the case where the selected mode of operation agrees with the acid ion water generating mode, the controller 21 sets the relays 30 and 31 in the relay unit 90 so that a positive potential is applied to the electrode 9 and a negative potential is applied to the electrode 10. The application of the dc voltage between the electrodes 9 and 10 causes electrolysis in the electrolytic cell 7. Specifically, the source water in the electrolytic cell 7 is electrolyzed into alkali ion water and acid ion water. In the electrolytic cell 7, the alkali ion water occurs in the chamber 10A while the acid ion water occurs in the chamber 9A. The controller 21 derives the information of the desired pH of the generated ion water from the output signal of the operation/display section 22. In addition, the controller 21 derives the information of the rate of the source water supply to the electrolytic cell 7 from the output signal of the flow rate sensor 6. The controller 21 calculates or determines the desired mean dc voltage applied between the electrodes 9 and 10 in response to the desired pH of the generated ion water and the rate of the source water supply to the electrolytic cell 7. During an initial stage, the controller 21 gradually increases the actual mean dc voltage applied between the electrodes 9 and 10 to the desired mean dc voltage. The increase in the actual mean dc voltage is realized by increasing the duty cycle of the output pulse signal to the voltage adjuster 29. Until the actual mean dc voltage reaches the desired mean dc voltage, the controller 21 judges the actual pH of the generated ion water to be different from the desired pH thereof. Accordingly, the controller 21 changes the three-way valve 14 so that the chamber 9A in the electrolytic cell 7 communicates with the drain pipe 11a and hence the water flows from the chamber 9A to the drain pipe 11a. The water is removed from the apparatus 3 via the drain pipe 11a. On the other hand, when the actual mean dc voltage reaches the desired mean dc voltage, the controller 21 judges the actual pH of the generated ion water to be equal to the desired pH thereof. Accordingly, the controller 21 changes the three-way valve 14 so that the chamber 9A in the electrolytic cell 7 communicates with the discharge pipe 13 and hence the acid ion water flows from the chamber 9A to the discharge pipe 13. The acid ion water is continuously discharged from the apparatus 3 via the discharge pipe 13. When the detected rate of the flow of the source water into the electrolytic cell 7 drops to or below the reference flow rate, the controller 21 changes and sets the voltage adjuster 29 so that the application of the dc voltage between the electrodes 9 and 10 is continuously inhibited. Thus, the acid ion water generating mode of operation terminates. After the end of the acid ion water generating mode of operation, the controller 21 changes the relay 30 and thereby opens the electromagnetic valve 15 so that the water flows from the electrolytic cell 7 to the drain pipe 11a. The water is removed from the apparatus 3 via the drain pipe 11a so that the acid ion water can be prevented from being used as drink.

During the execution of the alkali ion water generating mode of operation or the acid ion water generating mode of operation except the initial stage, the controller 21 maintains the actual mean dc voltage applied between the electrodes 9 and 10 at essentially the desired mean dc voltage. As previously described, the level of the voltage signal outputted from the rectifying/smoothing circuit 28 to the controller 21 depends on the magnitude or amplitude of the ac current detected by the current transducer 27, that is, depends on the magnitude or amplitude of the ac current flowing into the dc power supply 26. Since the magnitude or amplitude of the ac current flowing into the dc power supply 26 varies as a function of the mean value of the dc voltage applied between the electrodes 9 and 10, the voltage signal outputted from the rectifying/smoothing circuit 28 to the controller 28 represents the mean value of the dc voltage applied between the electrodes 9 and 10. The voltage signal outputted from the rectifying/smoothing circuit 28 to the controller 28 also represents the mean value of the dc current driven through the electrodes 9 and 10. The controller 21 detects the actual mean dc voltage applied to the electrodes 9 and 10 by referring to the output signal from the rectifying/smoothing circuit 28. The controller 21 compares the actual mean dc voltage with the desired mean dc voltage. This process corresponds to the operation of the comparator 20. When the actual mean dc voltage exceeds the desired mean dc voltage (this condition corresponds to an over current through the electrodes 9 and 10), the controller 21 operates the voltage adjuster 29 so that the actual mean dc voltage applied between the electrodes 9 and 10 will drop. When the actual mean dc voltage decreases below the desired mean dc voltage (this condition corresponds to an insufficient current through the electrodes 9 and 10), the controller 21 operates the voltage adjuster 29 so that the actual mean dc voltage applied between the electrodes 9 and 10 will increase. As a result, the actual mean dc voltage applied between the electrodes 9 and 10 is maintained at essentially the desired mean dc voltage. This state corresponds to the fact that an actual mean electric current through the electrodes 9 and 10 is maintained at essentially a desired mean electric current. When the actual mean dc voltage is approximately equal to the desired mean dc voltage, the pH of the discharged alkali ion water or the discharged acid ion water substantially agrees with the desired pH. As the desired pH is varied, the desired mean dc voltage is changed. Therefore, the actual pH of the-discharged alkali ion water or the discharged acid ion water follows the desired pH.

During the execution of the alkali ion water generating mode of operation or the acid ion water generating mode of operation except the initial stage, the controller 21 or the comparator 20 decides whether or not the actual mean dc voltage applied between the electrodes 9 and 10 is in a given acceptable range $\Delta V$ (see FIG. 7) around the desired mean dc voltage. When the actual mean dc voltage is decided to be in the acceptable range $\Delta V$, the controller 21 or the comparator 20 controls an indicator in the operation/display section 22 to inform the user of the acceptable condition. When the actual mean dc voltage is decided to be outside the acceptable range $\Delta V$, the controller 21 or the comparator 20 controls the indicator in the operation/display section 22 to inform the user of the unacceptable condition. In addition, the controller 21 or the comparator 20 decides whether or not the actual mean electric current through the electrodes 9 and 10 is in a given acceptable range $\Delta I$ (see FIG. 8) around the desired mean electric current. When the actual mean electric current is decided to be in the acceptable range $\Delta I$, the controller 21 or the comparator 20 controls the indicator in the operation/display section 22 to inform the user of the acceptable condition. When the actual mean electric current is decided to be outside the acceptable range $\Delta I$, the controller 21 or the comparator 20 controls the indicator in the operation/display section 22 to inform the user of the unacceptable condition.

In the case where the selected mode of operation agrees with the filtered water generating mode, the controller 21 sets the voltage adjuster 29 so that the application of the dc voltage between the electrodes 9 and 10 is continuously inhibited. As a result, electrolysis does not occur in the electrolytic cell 7. The filtered water flows into the electrolytic cell 7 from the filtering section 4. The controller 21 changes the three-way valve 14 so that the chamber 9A in the electrolytic cell 7 communicates with the discharge pipe 13 and hence the filtered water flows from the chamber 9A to the discharge pipe 13. The filtered water is continuously discharged from the apparatus 3 via the discharge pipe 13.

During the alkali ion water generating mode of operation, scales deposit on at least one of the electrodes 9 and 10. The electrode cleaning mode of operation is executed to remove the scales from at least one of the electrodes 9 and 10. In the case where the selected mode of operation agrees with the electrode cleaning mode, the controller 21 detects whether the water supply to the electrolytic cell 7 is currently present or absent by referring to the output signal from the flow rate sensor 6. When the water supply to the electrolytic cell 7 is detected to be absent, the controller 21 sets the relays 30 and 31 in the relay unit 90 so that a positive potential is applied to the electrode 9 and a negative potential is applied to the electrode 10. The application of the dc voltage between the electrodes 9 and 10 dissolves scales on at least one of the electrodes 9 and 10 back into the water in the electrolytic cell 7. During an initial stage, the controller 21 gradually increases the mean dc voltage applied between the electrodes 9 and 10 as in the alkali ion water generating mode. After the removal of the scales from at least one of the electrodes 9 and 10 has been completed, the controller 21 changes the relay 30 and thereby opens the electromagnetic valve 15 so that the water flows from the electrolytic cell 7 to the drain pipe 11a via the electromagnetic valve 15. The water is removed from the apparatus 3 via the drain pipe 11a.

It is preferable that the controller 21 counts the number of times of execution of the alkali ion water generating mode and measures the total time of use of the electrodes 9 and 10 in the alkali ion water generating mode after the end of preceding execution of the electrode cleaning mode. In this case, the controller 21 compares the counted number of times and the measured total time with a predetermined reference number of times and a predetermined reference time respectively. When the counted number of times reaches the reference number of times and also the water supply to the electrolytic cell 7 is detected to be absent, the controller 21 automatically starts the electrode cleaning mode of operation of the apparatus 3. When the measured total time reaches the reference time and also the water supply to the electrolytic cell 7 is detected to be absent, the controller 21 automatically starts the electrode cleaning mode of operation of the apparatus 3.

Figure 3:
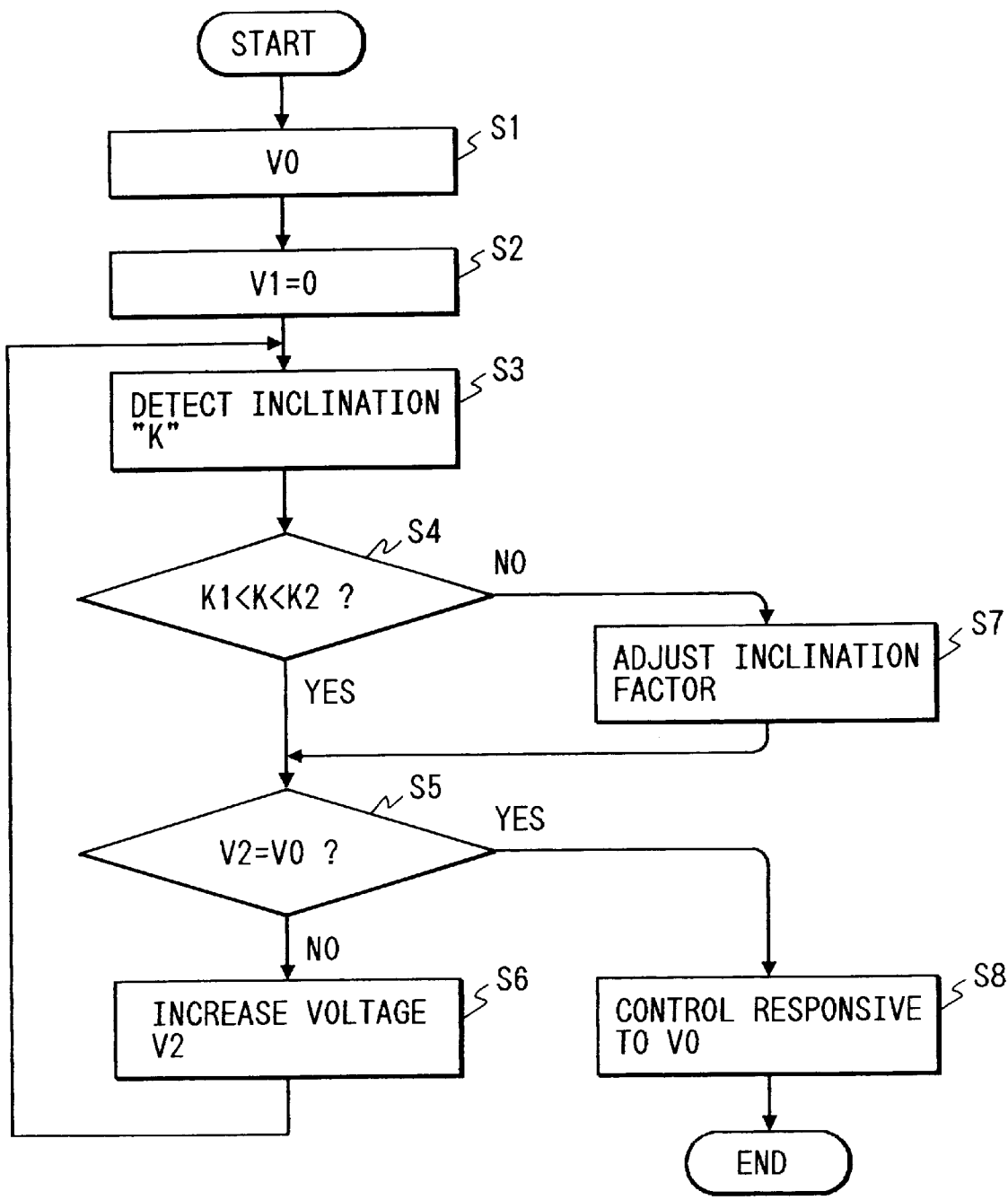
FIG. 3 is a flowchart of a segment of a program for operating a controller in FIGS. 1 and 2.

As previously described, the controller 21 operates in accordance with a program stored in the internal ROM. FIG. 3 is a flowchart of a segment of the program which provides the gradual increase in the actual mean dc voltage applied between the electrodes 9 and 10 during the initial stage of the alkali ion water generating mode of operation, the acid ion water generating mode of operation, or the electrode cleaning mode of operation.

As shown in FIG. 3, a first step S1 of the segment of the program derives information of a desired pH of generated ion water from the output signal of the operation/display section 22. In addition, the step Si derives information of the rate of the source water supply to the electrolytic cell 7 from the output signal of the flow rate sensor 6. Then, the step calculates or determines a final desired mean dc voltage V0 applied between the electrodes 9 and 10 in response to the desired pH of the generated ion water and the rate of the source water supply to the electrolytic cell 7.

A step S2 following the step S1 sets a variable V1 to a predetermined initial value. The variable V1 indicates a first desired mean dc voltage applied between the electrodes 9 and 10. The initial value of the desired mean dc voltage V1 corresponds to, for example, a zero voltage "0". After the step S2, the program advances to a step S3.

The step S3 periodically detects the actual mean dc voltage applied between the electrodes 9 and 10 at predetermined short intervals by referring the output signal from the rectifying/smoothing circuit 28. Then, the step S3 detects an inclination (a rate or a slope) "k" of a change in the actual mean dc voltage by referring to the results of the periodical detection of the actual mean dc voltage. The step S3 corresponds to the inclination detector 19.

A step S4 following the step S3 decides whether or not the detected inclination "k" lies in a predetermined range between limit inclinations K1 and K2. When the detected inclination "k" lies in the predetermined range, the program advances from the step S4 to a step S5. Otherwise, the program advances from the step S4 to a step S7.

The step S5 detects the actual mean dc voltage V2 applied between the electrodes 9 and 10 by referring the output signal from the rectifying/smoothing circuit 28. Then, the step S5 decides whether or not the actual mean dc voltage V2 is equal to the final desired mean dc voltage V0. When the actual mean dc voltage V2 is different from the final desired mean dc voltage V0, the program advances from the step S5 to a step S6. When the actual mean dc voltage V2 is equal to the final desired mean dc voltage V0, the program advances from the step S5 to a step S8.

The step S6 increases the actual mean dc voltage applied to the electrodes 9 and 10 at a given inclination (a given slope or rate) by controlling the voltage adjuster 29. For example, the step S6 increments the first desired mean dc voltage V1 by a small value ΔV1 according to the program statement as "V1=V1+ΔV1". Then, the step S6 controls the voltage adjuster 29 in response to the first desired mean dc voltage V1 so that the actual mean dc voltage will increase at a rate corresponding to the small value ΔV1. After the step S6, the program returns to the step S3.

The step S7 adjusts an inclination factor (an inclination coefficient or a slope coefficient) so that the inclination or rate "k" of the increase in the actual mean dc voltage will fall into the predetermined range (between K1 and K2). For example, when the detected inclination "k" exceeds the upper limit K2, the step S7 decreases the small value ΔV1 used in the step S6. When the detected inclination "k" is smaller than the lower limit K1, the step S7 increases the small value ΔV1 used in the step S6. After the step S7, the program advances to the step S5. As a result of the process executed by the step S7, the inclination or rate "k" of the increase in the actual mean dc voltage will be essentially maintained in the predetermined range (between K1 and K2).

The step S8 controls the voltage adjuster 29 in response to the final desired mean dc voltage V0 so that the actual mean dc voltage will be essentially equal to the final desired mean dc voltage V0. After the step S8, the current execution cycle of the segment of the program ends.

During the initial stage of the alkali ion water generating mode of operation, the acid ion water generating mode of operation, or the cleaning mode of operation, the actual mean dc voltage applied between the electrodes 9 and 10 gradually increases to the desired mean dc voltage as a result of the processes by the program segment of FIG. 3. The steps S4 and S7 in FIG. 3 enable the inclination (rate) of the increase in the actual mean dc voltage to be maintained in the predetermined range (between K1 and K2). Accordingly, the increase in the-actual mean dc voltage from the initial mean voltage (for example, 0 V) to the desired mean dc voltage takes a given time. In the case where the predetermined range for the inclination is 18 V/sec to 9 V/sec and the desired mean dc voltage is 36 V, the increase in the actual mean dc voltage from the initial mean voltage to the desired mean dc voltage takes a time of 2 seconds to 4 seconds.

Experiments were performed in connection with the apparatus 3. During the experiments, measurements were given of an actual mean dc voltage applied between the electrodes 9 and 10, an actual mean electric current through the electrodes 9 and 10, and other parameters.

Figure 4:
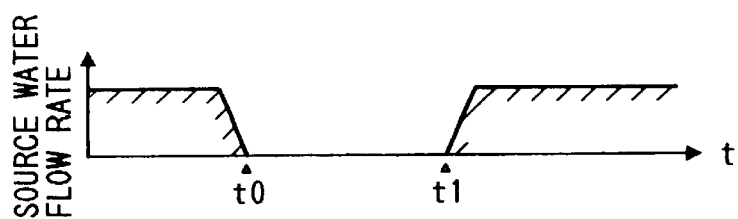
FIG. 4 is a time-domain diagram of a rate of flow of source water into the apparatus of FIG. 1.

During the experiments, the apparatus 3 was operated in the alkali ion water generating mode, and the supply of source water to the apparatus 3 was interrupted at a moment t0 as shown in FIG. 4 so that the alkali ion water generating mode of operation stopped. The supply of source water to the apparatus 3 remained interrupted for an interval between the moment t0 and a subsequent moment t1 as shown in FIG. 4. At the moment t1, the supply of source water to the apparatus 3 was started as shown in FIG. 4 so that the alkali ion water generating mode of operation was restarted.

Figure 5:
FIG. 5 is a time-domain diagram of the ion concentration in source water in a mineral supply section of the apparatus of FIG. 1.
Figure 6:
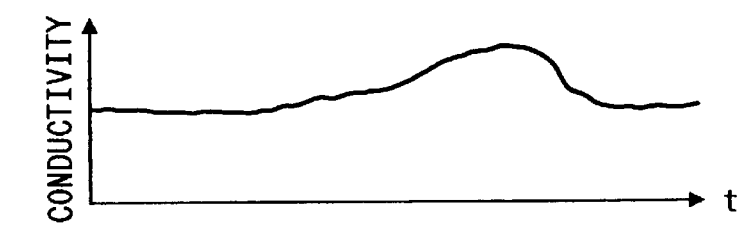
FIG. 6 is a time-domain diagram of the electric conductivity of water in an electrolytic cell in the apparatus of FIG. 1.

Under these conditions, the ion concentration in source water in the mineral supply section 5 varied as shown in FIG. 5, and the electric conductivity of water in the electrolytic cell 7 varied as shown in FIG. 6. As shown in FIG. 5, during the interruption of the supply of source water to the apparatus 3, the ion concentration in source water in the mineral supply section 5 increased since calcium ions and other ions dissolved in the source water. At the start of the supply of source water to the apparatus 3 after the interruption of the supply of source water to the apparatus 3, the source water having a high ion concentration flowed into the electrolytic cell 7 so that the electric conductivity of water in the electrolytic cell 7 temporarily increased as shown in FIG. 6.

Figure 7:
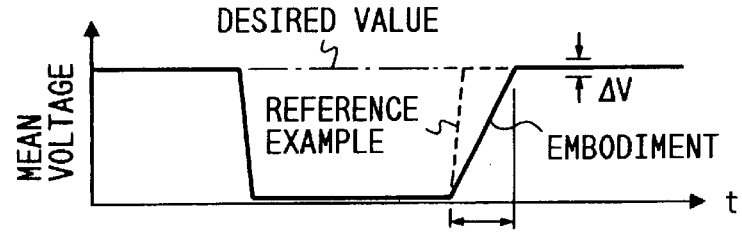
FIG. 7 is a time-domain diagram of a mean value of a dc voltage applied between electrodes in the apparatus of FIG. 1.
Figure 8:
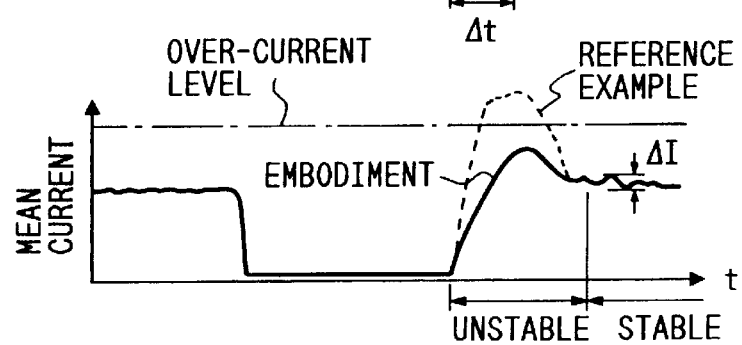
FIG. 8 is a time-domain diagram of a mean value of an electric current through electrodes in the apparatus of FIG. 1.
Figure 9:
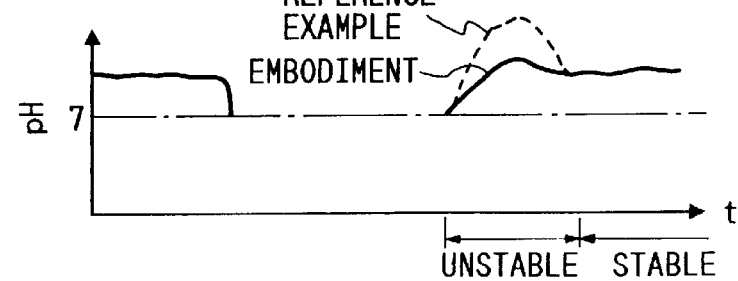
FIG. 9 is a time-domain diagram of the pH of alkali ion water generated by the apparatus of FIG. 1.

As shown in FIG. 7, during an interval Δt corresponding to the start of the supply of source water to the apparatus 3 after the interruption of the supply of source water to the apparatus 3, the actual mean dc voltage applied between the electrodes 9 and 10 gradually increased to the desired mean dc voltage. The inclination (rate) of the increase in the actual mean dc voltage was maintained in the predetermined range (between K1 and K2). This control of the actual mean dc voltage prevented the actual mean electric current through the electrodes 9 and 10 from reaching an over-current level as shown in FIG. 8. In addition, as shown in FIG. 9, the pH of generated alkali ion water gradually increased to the desired pH.

Figure 10:
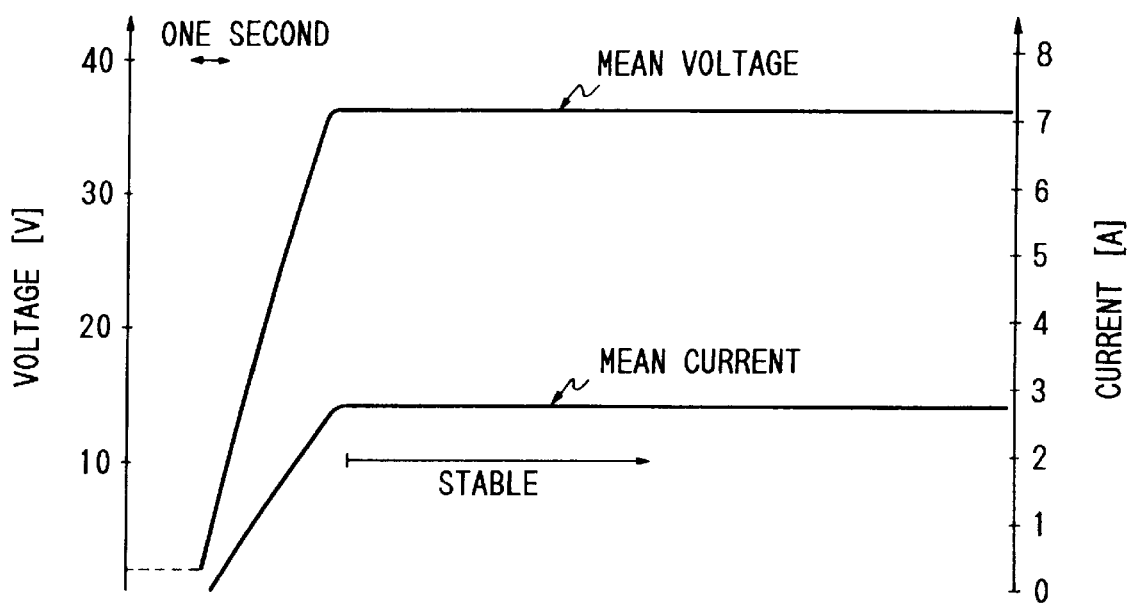
FIG. 10 is a time-domain diagram of a mean value of a dc voltage applied between electrodes and a mean value of an electric current through the electrodes in the apparatus of FIG. 1.

In a reference example, an actual mean dc voltage applied between electrodes abruptly increased to a desired mean dc voltage at a start of source water supply as shown in FIG. 7. The abrupt increase in the actual mean dc voltage caused an actual mean electric current through the electrodes from exceeding an over-current level as shown in FIG. 8. In addition, as shown in FIG. 9, the pH of generated alkali ion water exceeded a desired pH. According to the embodiment of this invention, in the case where the desired mean dc voltage was 36 V, the actual mean dc voltage applied between the electrodes 9 and 10 gradually increased to the desired mean dc voltage as shown in FIG. 10 during a start of the alkali ion generating mode of operation of the apparatus 3. About 4 seconds were spent in the increase of the actual mean dc voltage from the initial mean voltage to the desired mean dc voltage. As the actual mean dc voltage gradually increased, the actual mean electric current through the electrodes 9 and 10 gradually increased. It was understood from FIG. 10 that the actual mean electric current was prevented from reaching an over-current level, and that the actual mean electric current moved into a stable state at a moment which followed the start of the electrolysis by 3 seconds to 4 seconds.

Figure 11:
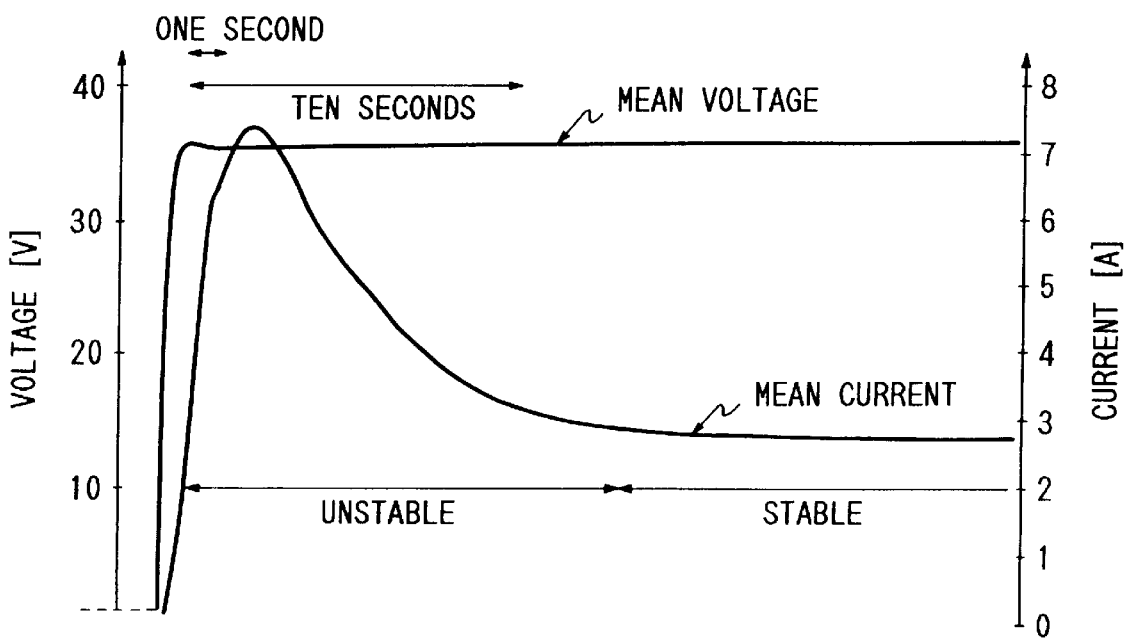
FIG. 11 is a time-domain diagram of a mean value of a dc voltage applied between electrodes and a mean value of an electric current through the electrodes which occur in a reference example.

According to a reference example, in the case where a desired mean dc voltage was 36 V, an actual mean dc voltage applied between electrodes abruptly increased to the desired mean dc voltage as shown in FIG. 11 during a start of alkali ion generating operation. It was understood from FIG. 11 that the abrupt increase in the actual mean dc voltage caused an actual mean electric current to exceed an over-current level, and that the actual mean electric current moved from an unstable state to a stable state at a moment which followed the start of the electrolysis by at least 10 seconds. The unstable actual mean electric current results in an unstable pH of generated ion water.

According to a modification of the embodiment of this invention, during a given interval from the start of electrolysis, the controller 21 controls the indicator in the operation/display section 22 to inform the user that the pH of generated ion water is unstable. After the given interval elapses from the start of electrolysis, the controller 21 controls the indicator in the operation/display section 22 to inform the user that the pH of generated ion water is stable.

In another modification of the embodiment of this invention, the actual dc voltage applied between the electrodes 9 and 10 is detected by a voltage sensor directly coupled with voltage feed lines to the electrodes 9 and 10. In addition, the voltage sensor is followed by an averaging circuit (a smoothing circuit) which informs the controller 21 of a mean value of the actual dc voltage.

What is claimed is:

1. An apparatus for generating alkali ion water, comprising:
   an electrolytic cell;
   at least two electrodes disposed in the electrolytic cell;
   a diaphragm disposed in the electrolytic cell and extending between the electrodes;
   means for supplying a dc voltage to the electrodes; and
   means for varying a mean value of the dc voltage at a constant rate.

2. The apparatus of claim 1, further comprising first detecting means for detecting an ac current and generating a signal representative thereof, and wherein the supplying means comprises means for deriving the dc voltage from the ac current, and the varying means comprises second detecting means for detecting the mean value of the dc voltage in response to the signal generated by the first detecting means, third detecting means for detecting a rate in a variation in the mean value of the dc voltage in response to the means value of the dc voltage which is detected by the second detecting means, and means for controlling the mean value of the dc voltage in response to the rate detected by the third detecting means.

3. An apparatus for generating alkali ion water, comprising:
   means for filtering source water;
   means, connected to the filtering means, for supplying mineral to the source water;
   an electrolytic cell connected to the mineral supplying means;
   at least two electrodes disposed in the electrolytic cell;
   a diaphragm disposed in the electrolytic cell and extending between the electrodes;
   means for supplying a dc voltage to the electrodes; and
   means for varying a mean value of the dc voltage at a constant rate.

4. The apparatus of claim 3, further comprising first detecting means for detecting an ac current and generating a signal representative thereof, and wherein the voltage supplying means comprises means for deriving the dc voltage from the ac current, and the varying means comprises second detecting means for detecting the mean value of the dc voltage in response to the signal generated by the first detecting means, third detecting means for detecting a rate in a variation in the mean value of the dc voltage in response to the mean value of the dc voltage which is detected by the second detecting means, and means for controlling the mean value of the dc voltage in response to the rate detected by the third detecting means.

5. An apparatus for generating alkali ion water, comprising:
   means for filtering source water;
   means, connected to the filtering means, for supplying mineral to the source water;
   an electrolytic cell connected to the mineral supplying means;
   at least two electrodes disposed in the electrolytic cell;
   a diaphragm disposed in the electrolytic cell and extending between the electrodes;
   first detecting means for detecting an ac current and generating a signal representative thereof;
   means for deriving a dc voltage from the ac current and supplying the dc voltage to the electrodes;

second detecting means for detecting a mean value of the dc voltage in response to the signal generated by the first detecting means;

means for determining a desired mean value of the dc voltage in response to a desired pH of generated ion water;

means for comparing the mean value of the dc voltage which is detected by the second detecting means with a given range around the desired mean value;

an indicator; and means for controlling the indicator in response to a result of comparison by the comparing means.

6. An apparatus for generating alkali ion water, comprising:

means for filtering source water;

means, connected to the filtering means, for supplying mineral to the source water;

an electrolytic cell connected to the mineral supplying means and having an outlet;

at least two electrodes disposed in the electrolytic cell;

a diaphragm disposed in the electrolytic cell and extending between the electrodes;

a discharge passage;

a drain passage;

means for selectively connecting the outlet of the electrolytic cell to the discharge passage or the drain passage;

means for supplying a dc voltage to the electrodes; and means for varying a mean value of the dc voltage at a constant rate.

7. An apparatus for generating alkali ion water, comprising:

means for filtering source water;

means, connected to the filtering means, for supplying mineral to the source water;

an electrolytic cell connected to the mineral supplying means and having an outlet;

at least two electrodes disposed in the electrolytic cell;

a diaphragm disposed in the electrolytic cell and extending between the electrodes;

a discharge passage;

a drain passage;

means for selectively connecting the outlet of the electrolytic cell to the discharge passage or the drain passage;

first detecting means for detecting an ac current and generating a signal representative thereof;

means for deriving a dc voltage from the ac current and supplying the dc voltage to the electrodes;

second detecting means for detecting a mean value of the dc voltage in response to the signal generated by the first detecting means;

means for determining a desired mean value of the dc voltage in response to a desired pH of generated ion water;

means for comparing the mean value of the dc voltage which is detected by the second detecting means with a given range around the desired mean value;

an indicator; and means for controlling the indicator in response to a result of comparison by the comparing means.

8. The apparatus of claim 7, wherein the first detecting means comprises a current transducer.

9. An apparatus for generating alkali ion water, comprising:

means for filtering source water;

means, connected to the filtering means, for supplying mineral to the source water;

an electrolytic cell connected to the mineral supplying means and having an outlet;

at least two electrodes disposed in the electrolytic cell;

a diaphragm disposed in the electrolytic cell and extending between the electrodes;

a discharge passage;

a drain passage;

means for selectively connecting the outlet of the electrolytic cell to the discharge passage or the drain passage;

first detecting means for detecting an ac current and generating a signal representative thereof;

means for deriving a dc voltage from the ac current and supplying the dc voltage to the electrodes;

second detecting means for detecting a means value of the dc voltage in response to the signal generated by the first detecting means;

third detecting means for detecting a first rate in a variation in the mean value of the dc voltage in response to the mean value of the dc voltage which is detected by the second detecting means;

means for increasing the mean value of the dc voltage at a second rate; and means for controlling the second rate in a range of 18 V/second to 9 V/second in response to the first rate detected by the first detecting means;

means for determining a desired mean value of the dc voltage in response to a desired pH of generated ion water;

means for comparing the mean value of the dc voltage which is detected by the second detecting means with a given range around the desired mean value;

an indicator; and means for controlling the indicator in response to a result of comparison by the comparing means.

10. An apparatus for generating alkali ion water, comprising:

an electrolytic cell for electrolyzing source water into alkali ion water and acid ion water;

means for supplying a dc voltage to the electrolytic cell; and means for varying a mean value of the dc voltage at a constant rate.

11. The apparatus of claim 10, further comprising first detecting means for detecting an ac current and generating a signal representative thereof, and wherein the supplying means comprises means for deriving the dc voltage from the ac current, and the varying means comprises second detecting means for detecting the mean value of the dc voltage in response to the signal generated by the first detecting means, third detecting means for detecting a rate in a variation in the mean value of the dc voltage in response to the mean value of the dc voltage which is detected by the second detecting means, and means for controlling the mean value of the dc voltage in response to the rate detected by the third detecting means.

12. An apparatus for generating alkali ion water, comprising:

an electrolytic cell for electrolyzing source water into alkali ion water and acid ion water;

means for supplying a dc voltage to the electrolytic cell; and means for detecting a rate of a variation in a mean value of the dc voltage.

13. An apparatus for generating alkali ion water, comprising:

an electrolytic cell;

at least two electrodes disposed in the electrolytic cell;

a diaphragm disposed in the electrolytic cell and extending between the electrodes;

means for supplying a dc voltage to the electrodes; and means for detecting a rate of a variation in a mean value of the dc voltage.

14. An apparatus for generating ion water, comprising:

an electrolytic cell for electrolyzing source water into ion water;

means for supplying a dc voltage to the electrolytic cell;

means for gradually increasing an effective level of the dc voltage at a rate; and means for limiting the rate to within a predetermined range.

15. The apparatus of claim 14, wherein the increasing means comprises means for determining a desired level, and means for gradually increasing the effective level of the dc voltage to the desired level.

* * * * *